United States Patent
Takahashi (10) Patent No.: US 6,577,592 B1
(45) Date of Patent: Jun. 10, 2003

(54) DISC CARTRIDGE

(75) Inventor: Kenji Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/557,550

(22) Filed: Apr. 25, 2000

(30) Foreign Application Priority Data

Apr. 30, 1999 (JP) .......................... 11-125189
Apr. 30, 1999 (JP) .......................... 11-125192

(51) Int. Cl.⁷ .................. G11B 23/03; G11B 17/02
(52) U.S. Cl. ........................ 369/291; 360/133
(58) Field of Search ................... 360/133, 97.01, 360/97.02, 99.6; 369/291

(56) References Cited

U.S. PATENT DOCUMENTS

| | | | | |
|---|---|---|---|---|
| 4,876,619 A | * | 10/1989 | Suzuki ................. | 360/97.01 |
| 4,994,930 A | | 2/1991 | Uehara ................. | 390/97.01 |
| 5,014,151 A | * | 5/1991 | Uehara et al. ......... | 360/133 |
| 5,161,080 A | * | 11/1992 | Funayama et al. ..... | 360/133 |
| 5,226,035 A | | 7/1993 | Kato et al. ............ | 369/291 |
| 5,289,457 A | * | 2/1994 | Akiyama .............. | 369/291 |
| 5,748,609 A | * | 5/1998 | Tanaka ................ | 369/291 |
| 6,094,327 A | * | 7/2000 | Sumner et al. ......... | 360/133 |
| 6,236,541 B1 | * | 5/2001 | Takahashi ............. | 360/133 |
| 2002/0109940 A1 | * | 8/2002 | Miyazaki et al. ....... | 360/133 |

FOREIGN PATENT DOCUMENTS

| | | | |
|---|---|---|---|
| EP | 0 142 411 A1 | 5/1985 | ........... G11B/17/04 |
| EP | 0 332 214 A2 | 9/1989 | ........... G11B/23/03 |
| EP | 0 459 743 A2 | 12/1991 | ........... G11B/23/03 |
| EP | 0 580 379 A1 | 1/1994 | ........... G11B/23/03 |
| EP | 0 727 783 A2 | 8/1996 | ........... G11B/23/03 |
| EP | 0 961 273 A2 | 12/1999 | ........... G11B/23/03 |
| GB | 2 190 532 A | 11/1987 | ........... G11B/17/04 |
| JP | 5-41055 | 2/1993 | ........... G11B/23/03 |
| JP | 7-312053 | 11/1995 | ........... G11B/23/03 |
| JP | 10-162541 | 6/1998 | ........... G11B/23/03 |

\* cited by examiner

*Primary Examiner*—Hoa T. Nguyen
*Assistant Examiner*—Dzung C. Nguyen
(74) *Attorney, Agent, or Firm*—Oblon, Spivak, McClelland, Maier & Neustadt, P.C.

(57) ABSTRACT

A disc cartridge comprised of a main cartridge body unit and a disc as an information recording medium accommodated in the main cartridge body unit. In preparing an engagement opening engaged by a movement controlling member of the disc recording and/or reproducing apparatus and which is provided on a shutter member adapted for opening/closing an aperture provided in the main cartridge body unit housing the disc, the shutter member is punched so that the punched portion will be on an inner recessed side of the engagement opening. The punched portion is bent inwardly of the shutter member to provide a curved surface on which abuts the movement member to assure stable engagement/disengagement in the engagement opening of the movement controlling member to prevent the inner peripheral surface of the engagement opening and the peripheral surface of the movement controlling member from being damaged by repeated engagement/disengagement of the movement controlling member.

6 Claims, 8 Drawing Sheets

DISC CARTRIDGE

BACKGROUND OF THE INVENTION

1. Field of the Invention

This invention relates to an optical disc housing a disc-shaped recording medium, such as an optical disc or a magneto-optical disc. More particularly, it relates to a disc cartridge having a shutter member adapted for opening/closing an aperture provided in the main cartridge body unit in which is housed a disc-shaped recording medium.

2. Description of Related Art

Figure 1:
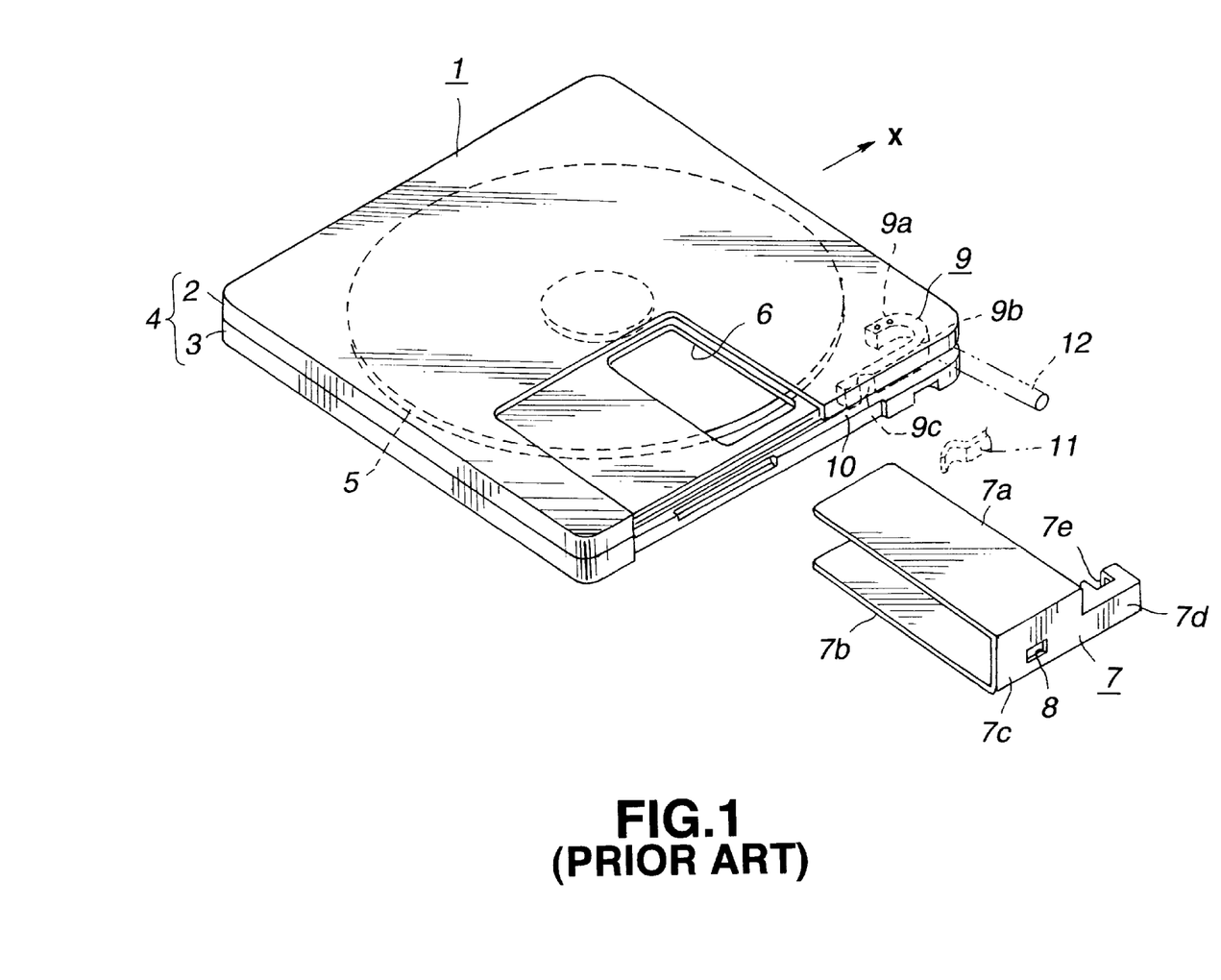
FIG. 1 is a perspective view showing a conventional disc cartridge.

Up to now, a disc cartridge, having housed therein a disc-shaped recording medium, such as an optical disc or a magneto-optical disc, used as a recording medium for a recording and/or reproducing apparatus, has been in widespread use. As this sort of the disc cartridge, such a one constructed as shown in FIG. 1 has been in use. The disc cartridge 1, shown in FIG. 1, has rotatably housed therein an optical disc 5 in a disc housing unit provided in a main cartridge body unit 4 obtained on abutting and interconnecting upper and lower cartridge halves. In the upper and lower sides of the main cartridge body unit 4, housing the optical disc 5 therein, there is formed a recording and/or reproducing aperture 6 for exposing at least a portion of the signal recording surface of the optical disc housed in the disc housing unit to outside across the inner and outer rims of the disc and for allowing the recording and/or reproducing means, such as an objective lens or a magnetic head of the optical pickup device, to face the optical disc 5.

The disc cartridge 1 is loaded on the disc recording and/or reproducing apparatus, and is stored, as the optical disc 5 is housed therein. The disc cartridge 1 is fitted with a shutter member 7 for closing the aperture 6 during storage of the disc cartridge a and for opening the aperture 6 when loading the disc cartridge on the disc recording and/or reproducing apparatus, in order to prevent intrusion of dust and dirt or the like foreign matter through the aperture 6 during the storage of the disc cartridge and resulting contamination of the optical disc 5.

The shutter member 7 is formed from a thin metal sheet and fabricated by punching, bending and severing a metal sheet material. The shutter member 7 is made up of first and second shutter portions 7a, 7b, extending parallel to each other for closing the apertures 6 formed in the upper and lower sides of the main cartridge body unit 4, and a connecting piece 7c interconnecting the proximal ends of the shutter portions 7a, 7b, to an overall U-shaped profile. On one side of the connecting piece 7c is formed a movement guide portion 7d engaged with the front side of the lower cartridge half 3 and which is adapted for guiding the direction of movement of the shutter member 7. In the connecting piece 7c is bored an engagement opening 8 engaged by a movement controlling member provided on the recording and/or reproducing apparatus.

The shutter member 7, constructed as described above, is fitted from the front side of the main cartridge body unit 4, so that the first and second shutter portions 7a, 7b will extend over the aperture 6. At this time, the movement guide portion 7d is fitted on the front side of the lower cartridge half 3 and engagement pieces on the proximal side of the second shutter portion 7b and on the movement guide portion 7d are engaged in a movement guide groove formed in the outer surface of the lower cartridge half 3, whereby the shutter member 7 is prevented from being incidentally detached from the main cartridge body unit 4 and is mounted for movement along the front side of the main cartridge body unit 4.

On one corner of the front surface of the main cartridge body unit 4, there is arranged a shutter lock member 9 for controlling the movement of the shutter member 7 moved to the position of closing the aperture 6 provided in the main cartridge body unit 4 to maintain the closed state of the aperture 6. This shutter lock member 9, formed of synthetic resin, has a mounting portion 9a for the lower cartridge half 3 on its proximal end. From the mounting portion 9a, there is extended a resiliently flexible lock arm section 9b having a substantially U-shaped cross-section. The distal end of the lock arm section 9b is provided with an engagement recess 9c engaged by a lock piece 7e formed by bending a portion of the movement guide portion 7d of the shutter member 7. When the shutter member 7 is moved to a position of closing the aperture 6 provided in the main cartridge body unit 4, the lock piece 7e is engaged in the engagement recess 9c, so that the shutter lock member 9 controls the movement of the shutter member 7 to hold the aperture 6 in the closed state.

In the front surface of the main cartridge body unit 4 is formed an opening actuating member engagement groove 10 into which is intruded a shutter opening actuating member provided on the disc recording and/or reproducing apparatus for resiliently displacing the shutter lock member 9 to disengage the lock piece 7e from the engagement recess 9c. This engagement groove 10 is formed in the front surface of the main cartridge body unit 4 by into the lateral side perpendicular to the front surface of the main cartridge body unit 4.

When the above-described disc cartridge 1 is progressively introduced into the disc recording and/or reproducing apparatus, with one of the lateral sides perpendicular to the front side carrying the shutter member 7 as the inserting end, with the direction indicated by arrow X in FIG. 1 as an inserting direction, the movement controlling member 11 for the shutter member 7, provided on the disc recording and/or reproducing apparatus, rides on the movement guide portion 7d of the shutter member 7 and subsequently on the connecting piece 7c from the front side of the main cartridge body unit 4. Subsequently to riding of the movement controlling member 11 on the front surface of the main cartridge body unit 4, a shutter opening actuating member 12 provided on the disc recording and/or reproducing apparatus is intruded into the opening actuating member engagement groove 10 to cause resilient flexure of a lock arm section 9b of the shutter lock member 9 towards the inside of the main cartridge body unit 4. When the disc cartridge is further introduced into the disc recording and/or reproducing apparatus, the movement controlling member 11 is engaged in an engagement opening bored in the connecting piece 7c to control the movement of the shutter member 7. The shutter opening actuating member 12 also causes the lock arm section 9b towards the inside of the main cartridge body unit 4 to disengage the lock piece 7e from the lock recess 9c.

When the shutter member 7 is unlocked to control the movement of the shutter member 7 and the disc cartridge 1 is subsequently introduced further into the interior of the recording and/or reproducing apparatus, the main cartridge body unit 4 is moved relative to the movement-controlled shutter member 7, in the direction indicated by arrow X in FIG. 1, to open the aperture 6. Since the shutter member 7 is maintained in its movement-controlled state by the movement controlling member 11, the shutter member 7 is maintained in its state of having opened the aperture 6. The optical pickup device and/or the magnetic head is allowed to face the optical disc 5 through this aperture 6 to permit recording and/or reproduction of information signals.

When the recording or reproduction of information signals recorded on or reproduced from the optical disc 5 comes to a close, and the disc is to be ejected, the disc cartridge 1 is moved to outside of the disc recording and/or reproducing apparatus in a direction opposite to the arrow X direction in FIG. 1. Since the shutter member 7 is maintained by the movement controlling member 11 in the movement-controlled state, only the main cartridge body unit 4 is moved relative to the shutter member 7 in a direction opposite to the arrow X direction in FIG. 1 to cause the shutter member 7 to perform relative movement in a direction of closing the aperture 6. When the shutter member 7 is moved to the position of closing the aperture 6, the lock piece 7e is engaged in the engagement recess 9c of the shutter lock member 9 to maintain the aperture 6 closed by the shutter member 7. At this time, the disc cartridge 1 is projected partially to outside of the disc recording and/or reproducing apparatus, so that, by gripping and pulling out the protruded portion of the disc cartridge 1 from the disc recording and/or reproducing apparatus, the disc cartridge 1 is taken out from the disc recording and/or reproducing apparatus.

In the above-described disc cartridge in which the movement of the shutter member is controlled in opening/closing the aperture provided in the main cartridge body unit, the movement controlling member is engaged with or disengaged from the engagement opening provided in the shutter member for effecting loading/unloading of the disc cartridge with respect to the recording and/or reproducing apparatus. In particular, the biasing force of thrusting the shutter member against the front side of the main cartridge body unit is applied to the movement controlling member to reliably control the shutter member movement. If the movement controlling member afforded with the biasing force is repeatedly engaged with and disengaged from the engagement opening, the inner peripheral surface of the engagement opening is worn out and roughed to render it impossible to effect smooth engagement/disengagement of the movement controlling member.

On the other hand, the movement controlling member is also damaged by repeated sliding contact with the inner peripheral surface of the engagement opening, so that the inner peripheral surface of the engagement opening is roughed to render it impossible to effect smooth engagement/disengagement of the movement controlling member when loading/unloading another disc cartridge the inner surface of the engagement opening of which is not roughed. Should the engagement opening and/or the movement controlling member be damaged, the frictional resistance when the movement controlling member is engaged with or disengaged from the engagement opening is increased. Consequently, a larger force is required when taking out the disc cartridge from the disc recording and/or reproducing apparatus so that the ejecting operation cannot be achieved with an optimum operating feeling.

Should the wear to the engagement opening and/or in the movement controlling member be excessive, the frictional resistance produced at the time of engaging/disengaging the movement controlling member is also increased, such that, the movement controlling member occasionally cannot be disengaged from the engagement opening, with the result that the ejection operation cannot be performed with an optimum operating feeling.

OBJET AND SUMMARY OF THE INVENTION

It is therefore an object of the present invention to provide a disc cartridge which can be reliably loaded/unloaded on or from the disc recording and/or reproducing apparatus to effect reliable opening/closure of the aperture provided in the main cartridge body unit.

It is another object of the present invention to provide a disc cartridge which is able to assure stable engagement/disengagement of the movement controlling member with respect to the shutter member over a prolonged period of time.

For overcoming the problems inherent in the above-described conventional disc cartridge and for achieving the above objects, the present invention provides a disc cartridge comprised of a main cartridge body unit and a disc as an information recording medium accommodated in the main cartridge body unit. In preparing an engagement opening engaged by a movement controlling member of the disc recording and/or reproducing apparatus and which is provided on a shutter member adapted for opening/closing an aperture provided in the main cartridge body unit housing the disc, the shutter member is punched so that the punched portion will be on an inner recessed side of the engagement opening. The punched portion is bent inwardly of the shutter member to provide a curved surface on which abuts the movement member to assure stable engagement/disengagement in the engagement opening of the movement controlling member to prevent the inner peripheral surface of the engagement opening and the peripheral surface of the movement controlling member from being damaged by repeated engagement/disengagement of the movement controlling member.

DESCRIPTION OF THE PREFERRED EMBODIMENTS

Referring to the drawings, a preferred first embodiment of a disc cartridge according to the present invention will be explained in detail.

Figure 2:
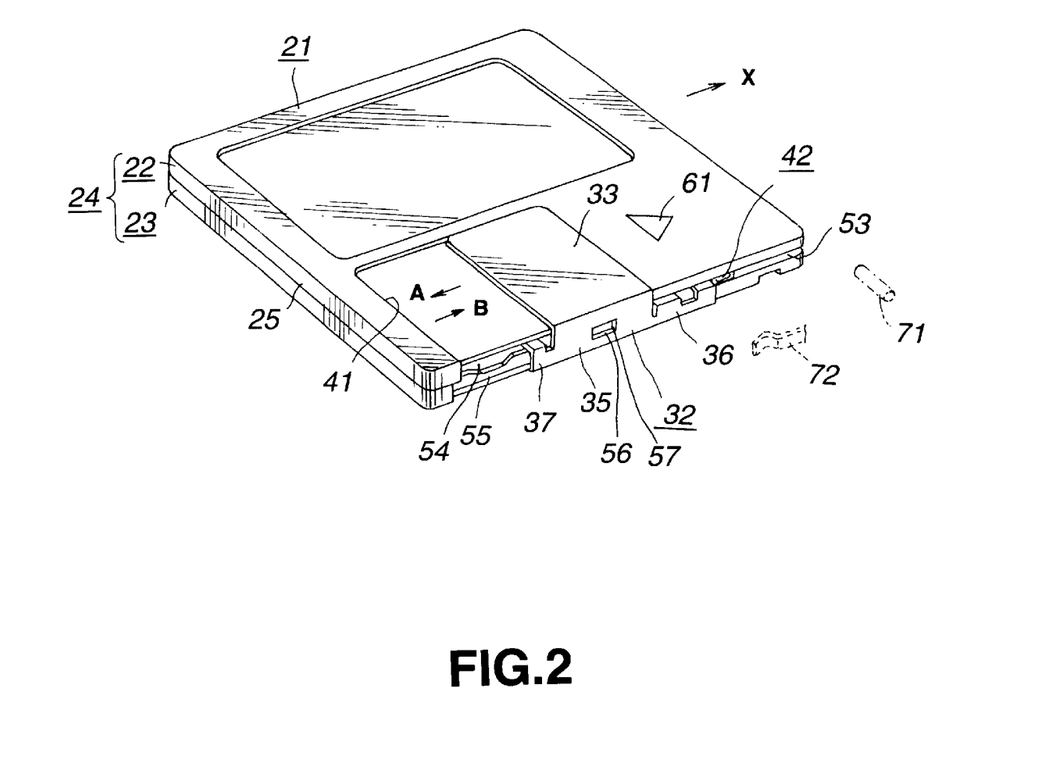
FIG. 2 is a perspective view of a disc cartridge according to the present invention.
Figure 3:
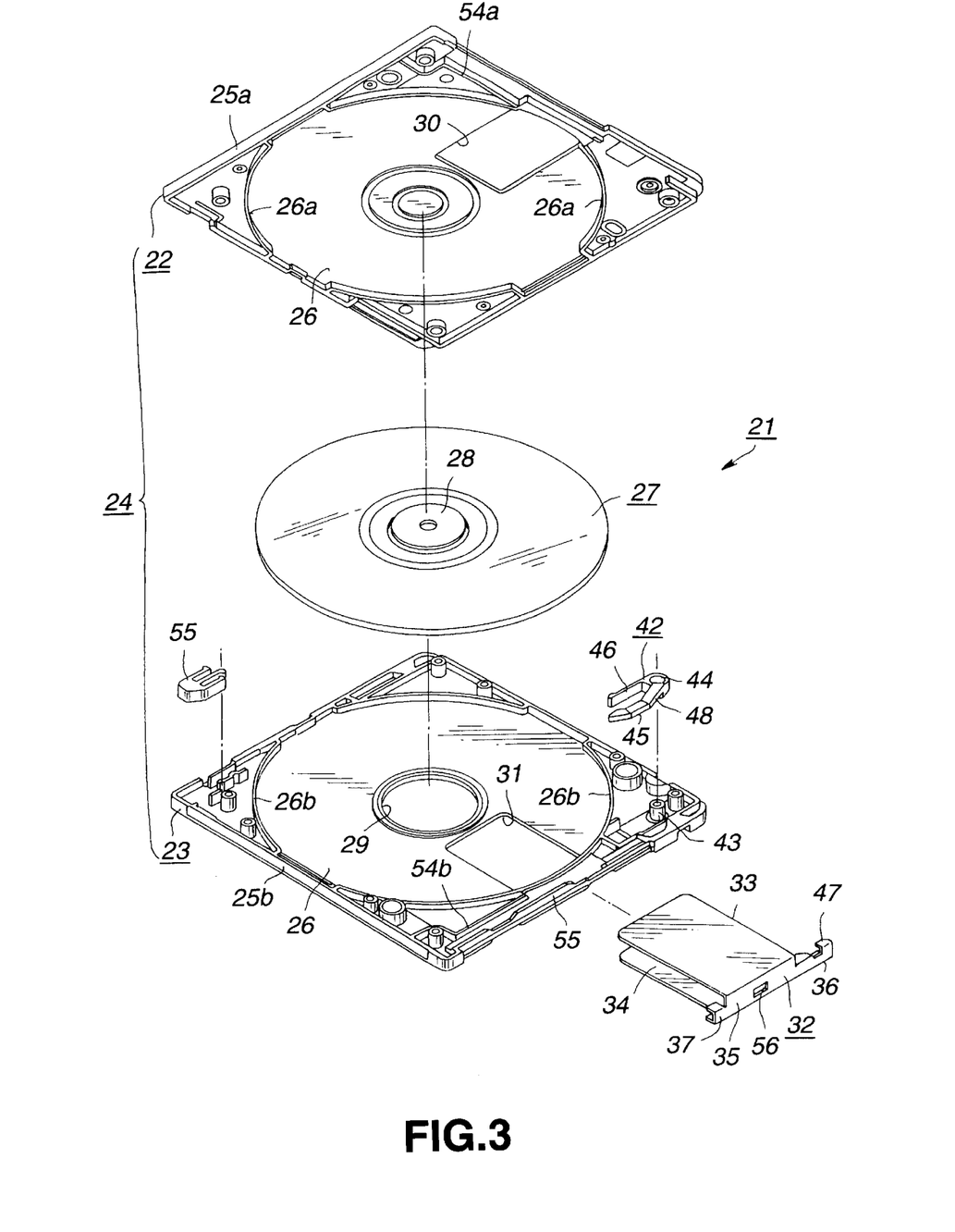
FIG. 3 is an exploded perspective view thereof.

This disc cartridge 21 includes a main cartridge body unit 24 formed by abutting and interconnecting rectangular-shaped upper and lower cartridge halves 22, 23 molded from a styrene resin, as shown in FIGS. 2 and 3. Around the upper and lower cartridge halves 22, 23 are formed upstanding wall sections 25a, 25b which, when the upper and lower cartridge halves 22, 23 are abutted and interconnected together, constitute a peripheral wall section 25 of the main cartridge body unit 24. On the facing sides of the upper and lower cartridge halves 22, 23 are formed housing section forming wall sections 26a, 26b for defining a circle inscribing these upper and lower cartridge halves 22, 23. These housing section forming wall sections 26a, 26b are abutted together to constitute a disc housing section 26 within the main cartridge body unit 24. An optical disc 27 is rotatably housed within the disc housing section 26.

Centrally of the lower cartridge half 23 constituting the lower side of the main cartridge body unit 24, there is formed a circular central opening 29 through which a magnet clamping hub 28 mounted centrally of the optical disc 27 housed in the main cartridge body unit 24 is exposed to outside, as shown in FIG. 3. In this central opening 29 is intruded a disc table of a disc rotating driving unit adapted for rotationally driving the optical disc 27 housed in the main cartridge body unit 24 when loading the disc cartridge 21 on the disc recording and/or reproducing apparatus. That is, when the disc cartridge 21 is loaded on the disc recording and/or reproducing apparatus, the optical disc 27 is clamped on the disc table intruded through the central opening 29 into the interior of the main cartridge body unit 24, and is rotated in unison with the disc table.

The upper and lower cartridge halves 22, 23, making up the upper and lower sides of the main cartridge body unit 24, are provided with recording and/or reproducing apertures 30, 31 for exposing at least portions of the signal recording area of the optical disc 27 housed in the disc housing section 26 to outside across the inner and outer rims of the disc and for allowing recording and/or reproducing means, such as objective lens or magnetic head, of the optical pickup device, to face the optical disc 27, as shown in FIG. 3. These recording and/or reproducing apertures 30, 31 are formed for extending from a center portion in the left-and-right direction of the main cartridge body unit 24 in the vicinity of the central opening 29 to the front side of the main cartridge body unit 24, as its lateral side, as shown in FIG. 3.

The disc cartridge 21 according to the present invention is loaded on the disc recording and/or reproducing apparatus or stored as it houses the optical disc 27 therein. In order to prevent intrusion of dust and dirt or the like foreign matter through the recording and/or reproducing apertures 30 or 31 to contaminate the optical disc during storage of the disc cartridge 21, there is mounted a shutter member 32 for closing the apertures 30, 31 during storage of the disc cartridge 21 and for opening the apertures 30, 31 when loading the disc cartridge 21 on the disc recording and/or reproducing apparatus.

Figure 4:
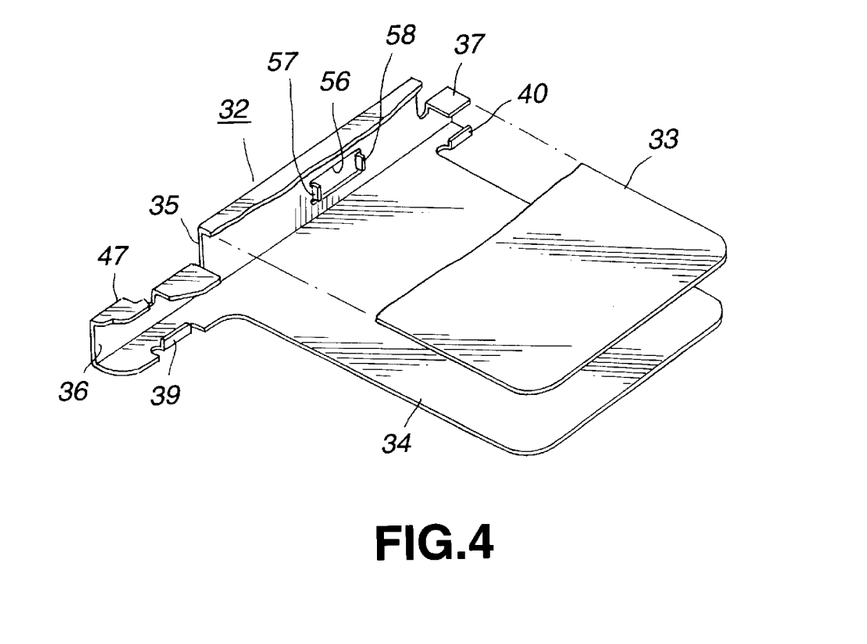
FIG. 4 is a perspective view showing a shutter member constituting a disc cartridge according to the present invention.

The shutter member 32 is formed from a thin sheet of metal, such as stainless steel, and is fabricated by machining such as bending and severing. Referring to FIGS. 3 and 4, the shutter member 32 is made up of first and second shutter portions 33, 34, extending parallel to each other to close the recording and/or reproducing apertures 30, 31 formed in the upper and lower sides of the main cartridge body unit 24, and a connecting piece 35 interconnecting the proximal ends of these shutter portions 33, 34. The shutter member 31 in its entirety has a U-shaped cross-section. On both sides of the connecting piece 35 are protuberantly formed first and second movement guide portions 36, 37 of a U-shaped cross-section for guiding the direction of movement of the shutter member 37.

Figure 5:
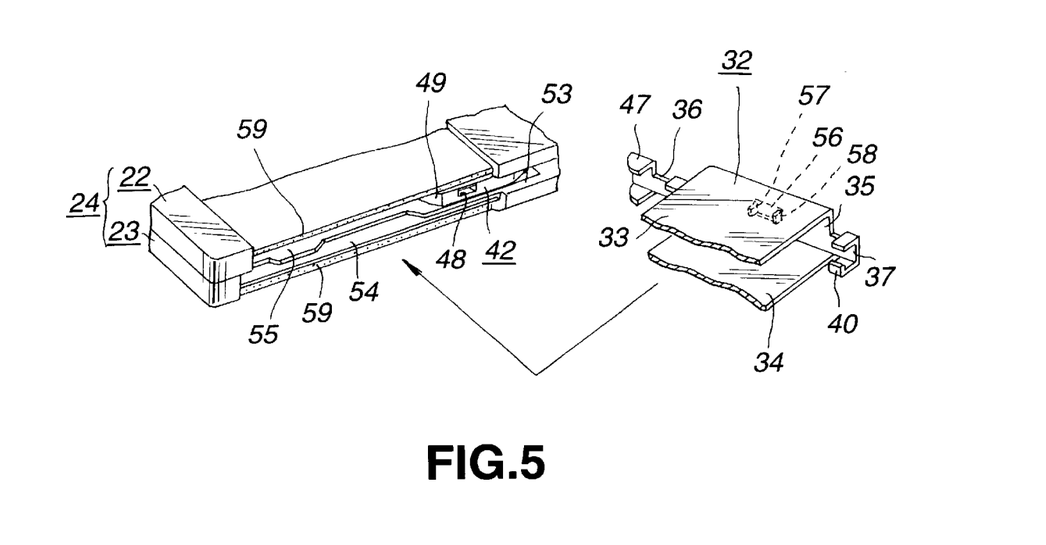
FIG. 5 is a perspective view showing the state of mounting the shutter member on the main cartridge body unit.

The shutter member 32 is fitted on the front side of the main cartridge body unit 24, as the first and second shutter portions 33, 34 are extended over the recording and/or reproducing apertures 30, 31, as shown in FIGS. 3 and 5. At this time, the first and second movement guide portions 36, 37 are fitted from the front side of the lower cartridge half 23, whilst the engagement pieces 39, 40, formed by bending a portion of the first and second movement guide portions 36, 37, are engaged in a movement guide groove, not shown, provided in the outer side of the lower cartridge half 23, as shown in FIGS. 4 and 5, to prevent extrication of the shutter member from the main cartridge body unit 24. By so doing, the shutter member 32 is mounted for movement along the front side of the main cartridge body unit 24 in a direction of opening/closing the recording and/or reproducing apertures 30, 31 as indicated by arrows A and B in FIG. 2.

In the front surface of the main cartridge body unit 24, extending from an area in which the shutter member 32 is moved to the position opening the apertures 30, 31 to the position in which the shutter member 32 opens the apertures 30, 32, to the front side of the main cartridge body unit 24, there is formed a shutter member movement recess 41 of a depth approximately equal to the thickness of the metal sheet constituting the shutter member 32, as shown in FIG. 2. Since the shutter member 32 is arranged in the shutter member movement recess 41, the shutter member 32 is substantially flush with the outer surface of the main cartridge body unit 24. In this state, the shutter member 32 is mounted in the main cartridge body unit 24.

Figure 6:
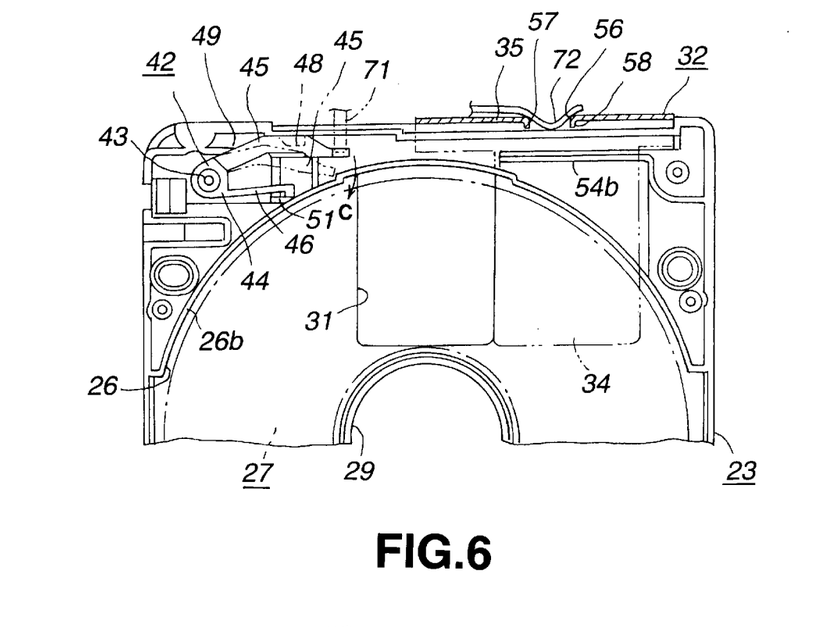
FIG. 6 is a plan view showing the state in which the shutter member has been moved to a position of opening the recording and/or reproducing aperture provided in the main cartridge body unit, with the upper cartridge half being omitted.

At a coner on the front side of the main cartridge body unit 24, there is mounted a shutter lock member 42 adapted for limiting the movement of the shutter member 32 moved to the position of closing the recording and/or reproducing apertures 30, 31, as shown in FIGS. 3 and 6. The shutter lock member 42 is molded from synthetic resin and has a pivot portion 44 fulcrumed on a pivot shaft 43 set upright on the proximal side. From this pivot portion 44 are extended a lock arm section 45 and a resilient flexible portion 46 in opposite directions to each other. On a lateral side of a mid portion of the lock arm section 45 is formed an engagement recess 48, engaged by a lock piece 47, formed by bending a portion of a first movement guide portion 36 of the shutter member 32. This shutter lock member 42 is mounted within the main cartridge body unit 24, with the pivot portion 44 being fulcrumed by the pivot shaft 43 set upright on the lower cartridge half 23, with a lateral side of the lock arm section 45 carrying the engagement recess 48 facing a cut-out 49 formed in the front side of the main cartridge body unit 24 and with the distal end of the resilient flexible portion 46 compressing against a retention lug 51 formed upright in the lower cartridge half 23, as shown in FIG. 6.

When the shutter member 32 has been moved to the position of closing the recording and/or reproducing apertures 30,31 provided in the main cartridge body unit 24, the shutter lock member 42 provided in the main cartridge body unit 24 as described above is engaged in the engagement recess 48 to restrict movement of the shutter member 42 to keep the closed state of the apertures 30, 31, as shown in FIG. 2, On the front side of the main cartridge body unit 24, on which the shutter member 32 is mounted for movement as described above, there is formed an opening actuating member engagement groove 53 into which is intruded a shutter opening actuating member 71 provided on the disc recording and/or reproducing apparatus. The shutter opening actuating member 71 resiliently deflects the shutter lock member 42 to disengage the lock piece 47 from the engagement recess 48 to cause the shutter member 32 to open the apertures 30, 31 by movement in the direction indicated by arrow A in FIG. 2. The opening actuating member engagement groove 53 is formed in the front surface of the main cartridge body unit 24 by cutting into a lateral side perpendicular to the front surface of the main cartridge body unit 24 along which is moved the shutter member 32, as shown in FIG. 2.

The opening actuating member engagement groove 53 is formed by forming a front wall section 54 constituting a portion of the peripheral wall section 25 of the main cartridge body unit 24 on an inwardly receded side of the main cartridge body unit 24. Specifically, the upstanding wall sections 54a, 54b, formed on the front side of the upper and lower cartridge halves 22, 23 constituting the front surface section 54, are positioned on inwardly receded sides of the upper and lower cartridge halves 22, 23 for extending parallel to the front end faces of the upper and lower cartridge halves 22, 23. The front wall section 54 is partially segmented to form a cut-out 49 through which the lateral side of the lock arm section 45 of the shutter lock member 42 provided with the engagement recess 48 is exposed to outside the main cartridge body unit 24, as shown in FIGS. 5 and 6. That is, the lock arm section 45 is protruded into the opening actuating member engagement groove 53 through the cut-out 49, as shown in FIGS. 2 and 5.

On the front side of the lower cartridge half 23, there is provided a shutter guide wall section 55 within the opening actuating member engagement groove 53. The shutter guide wall section 55 restricts oscillations of the first and second movement guide portions 36, 37 fitted on the front side of the lower cartridge half 23 to assure stable movement of the shutter member 32.

On the opposite side corner on the back side opposite to a corner of the front side carrying the shutter lock member 42 of the main cartridge body unit 42, there is movably mounted a mistaken recording inhibiting member 55 adapted for selecting whether or not information signals can be recorded on the optical disc 27 housed in the main cartridge body unit 24 by opening/closing the 1mistaken recording detection hole bored in the main cartridge body unit 24, as shown in FIG. 3.

Figure 7:
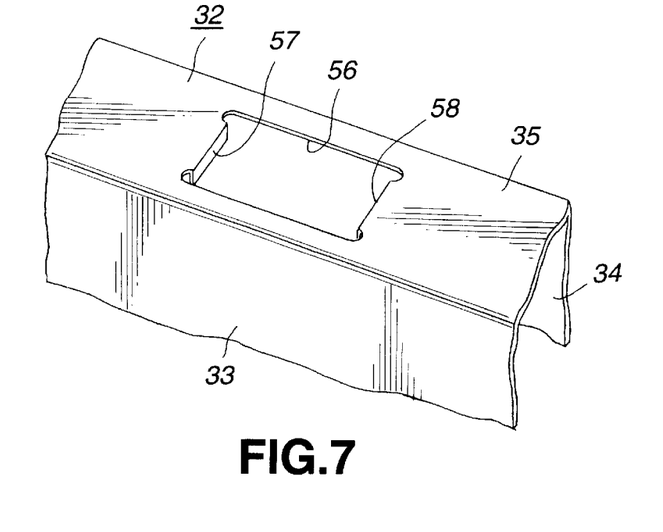
FIG. 7 is an enlarged perspective view showing the engagement opening portion provided in the shutter member.
Figure 8:
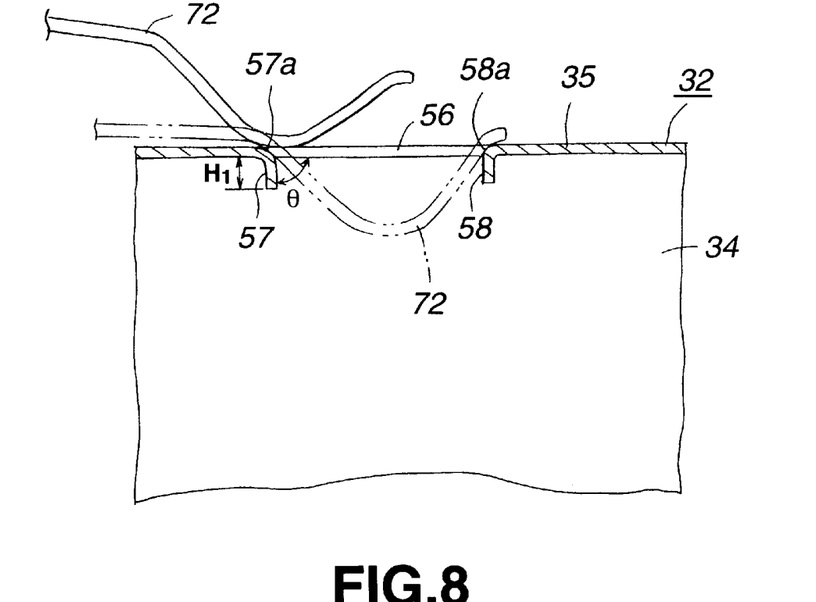
FIG. 8 is a cross-sectional view showing a bent piece provided in the engagement opening.

In the connecting piece 35 of the shutter member 32, mounted for movement on the front side of the main cartridge body unit 24, there is bored an engagement opening 56 engaged by a movement restricting member 72 provided on the disc recording and/or reproducing apparatus. The engagement opening 56 is formed as a rectangular opening having the direction of movement relative to the main cartridge body unit 24 as the long axis. On facing sides of the engagement opening 56 perpendicular to the direction of movement of the shutter member 32 relative to the main cartridge body unit 24, there are formed bent pieces 57, 58, formed by bending portions of the connecting piece 35, as shown in FIGS. 4 and 7. These bent pieces 57, 58 are formed in a direction towards the interior of the shutter member 32 corresponding to the direction of extension of the first and second shutter portions 33, 34, as shown in FIGS. 7 and 8. The bent pieces 57, 58 are of a height $H_1$ not colliding against the shutter guide wall section 55 provided on the front side of the main cartridge body unit 24 when the shutter member 32 is mounted on the front side of the main cartridge body unit 24, in order to prevent chips of the synthetic resin from being produced due to sliding contact of the bent pieces 57, 58 with the shutter guide wall section 55 during movement of the bent pieces 57, 58 in sliding contact with the shutter guide wall section 55.

The bent pieces 57, 58 are formed by a sequence of machining steps, including punching, bending and severing, performed on a metal sheet material for fabricating the shutter member 32. The bent pieces 57, 58 are bent at a bending angle $\theta_1$ relative to the connecting piece 35 of approximately 90 to 110°, that is so that the bent pieces 57, 58 are inclined towards the connecting piece 35. By warping the pieces 57, 58 so as to be perpendicular or inclined with respect to the connecting piece 35, the proximal ends 57a, 58a of the bent pieces 57, 58 are arcuately formed to enable the resiliently biased movement restricting member 72 on the front side of the disc cartridge 21 inserted into the interior of the disc recording and/or reproducing apparatus to be smoothly engaged in or disengaged from the engagement opening 56. Moreover, since the bent pieces 57, 58 are inclined towards the connecting piece 35, it is possible to prevent interference between the distal ends of the bent pieces 57, 58 having acute cutting surfaces and the movement restricting member 72 to prevent damages to the movement restricting member 72.

Figure 9:
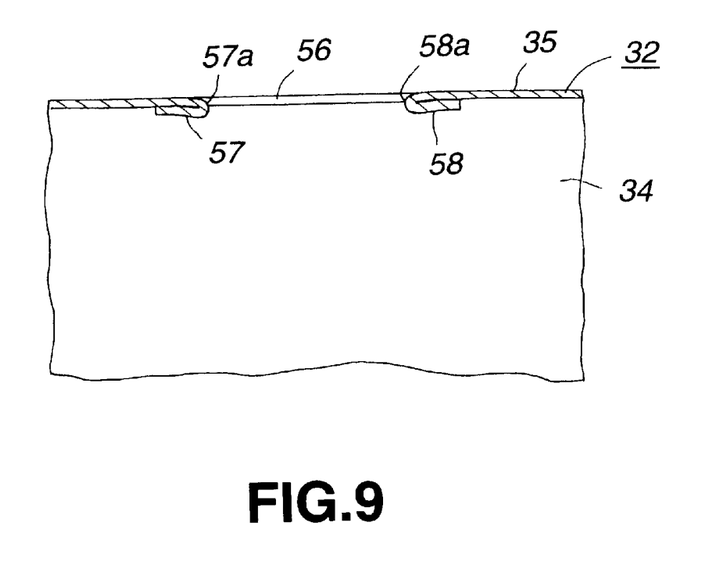
FIG. 9 is a cross-sectional view showing another embodiment of a bent piece provided in the engagement opening.

In order to prevent the interference between the movement restricting member 72 engaged in the engagement opening 56 and the distal ends of the bent pieces 57, 58 to prevent the bent pieces 57, 58 from being slidingly contacted with the main cartridge body unit 24, it is possible to bend the pieces 57, 58 so as to overlie the connecting piece 35, as shown in FIG. 9.

The above-described disc cartridge 21 is inserted into the interior of the disc recording and/or reproducing apparatus, with the lateral side thereof perpendicular to the front surface carrying the shutter member 32 as an inserting end, and with the arrow X direction in FIG. 2 as the inserting direction.

On the upper surface of the main cartridge body unit 24 is mounted an inserting direction displaying unit 61, indicating the direction of insertion into the disc recording and/or reproducing apparatus, as shown in FIG. 2. When the disc cartridge 21 is intruded into the interior of the disc recording and/or reproducing apparatus, the movement restricting member 72, biased into pressure contact with the front side of the disc cartridge 21, provided on the disc recording and/or reproducing apparatus, rides on the first movement guide portion 36 of the shutter member 32 from the front side of the main cartridge body unit 24 to then ride on the connecting piece 35. Next to this riding of the movement restricting member 72 on the front side of the main cartridge body unit 24, the shutter opening actuating member 71 provided on the disc recording and/or reproducing apparatus is intruded into the opening actuating member engagement groove 53 to resiliently deflect the lock arm section 45 of the shutter lock member 42 towards the inside of the main cartridge body unit 24 as indicated by arrow C in FIG. 6. When the disc cartridge 21 is intruded further into the inside of the disc recording and/or reproducing apparatus, the movement restricting member 72 is engaged with the engagement opening 56 bored in the connecting piece 35 to restrict movement of the shutter member 32. Simultaneously, the shutter opening actuating member 71 causes the lock arm section 49 to be further resiliently deflected towards the inside of the main cartridge body unit 24 to disengage the lock piece 47 from the engagement recess 48.

Meanwhile, when the movement restricting member 72 is engaged with the engagement opening 56, the movement restricting member 72 is slidingly contacted with the arcuately bent proximal ends 57a, 58a provided in the bent pieces 57, 58, provided in the engagement opening 56, so that no large frictional force is generated to realize smooth engagement.

When the shutter member 32 is unlocked and restricted as to its movement, after which the disc cartridge 21 is further intruded into the disc recording and/or reproducing apparatus, the main cartridge body unit 24 is moved relative to the movement-restricted shutter member 32, as indicated by arrow X in FIG. 2, to open the recording and/or reproducing apertures 30, 31. Since the shutter member 32 is kept in the movement-restricted state by the movement restricting member 72, the state of opening of the apertures 30, 31 is kept. The optical pickup device and/or the magnetic head faces the optical disc 27 through these apertures 30, 31 to enable recording recording and/or reproduction of information signals.

When the information has been recorded on the optical disc 27 or reproduction of information signals recorded on the optical disc comes to a close, and the disc is to be ejected, the disc cartridge 21 is moved towards the outside of the disc recording and/or reproducing apparatus as indicated by arrow X in FIG. 2. Since the shutter member 32 is maintained in the movement-restricted state, by the movement restricting member 72, only the main cartridge body unit 24 is moved in the direction indicated by arrow X in FIG. 2 relative to the shutter member 32. That is, the main cartridge body unit 24 is moved in the direction of closing the apertures 30, 31. When the shutter member 32 is moved to the position of closing the apertures 30, 31, the lock piece 47 is engaged with the engagement recess 48 of the shutter lock member 42 to keep the apertures 30, 31 closed by the shutter member 32. At this time, the disc cartridge 32 has its portion protruded to outside the disc recording and/or reproducing apparatus, so that, by grasping and pulling out the protruded portion of the disc cartridge from the disc recording and/or reproducing apparatus, the disc cartridge can be ejected from the disc recording and/or reproducing apparatus. Since the movement restricting member 72 is disengaged from the engagement opening 56, as it is slidingly contacted with the arcuately bent proximal ends 57a, 58a of the bent pieces 57, 58, the movement restricting member 72 can be smoothly disengaged without producing marked frictional force.

Thus, the disc cartridge 21 according to the present invention has bent pieces 57, 58 on the sides of engagement opening 56 perpendicular to the direction of movement of the shutter member 32, with the movement restricting member 72 provided on the disc recording and/or reproducing apparatus and resiliently biased into pressure contact with the front side of the disc cartridge 21 being engaged in or disengaged from the engagement opening 56. The result is that the force of friction when the movement restricting member 72 is engaged in or disengaged from the engagement opening 56 can be reduced to decrease the wear caused to the inner surface of the engagement opening 56 or the peripheral surface of the movement restricting member 72, thus assuring smooth engagement or disengagement over an extended period of time. In particular, the disc cartridge can be ejected from the disc recording and/or reproducing apparatus with an optimum operating feeling.

In the above-described disc cartridge 21, the bent pieces 57, 58 are provided on the two sides of the engagement opening 56 lying perpendicular to the direction of movement of the shutter member 32. Alternatively, only the bent piece 57 may be provided which is located at the intruding end of the disc cartridge 21 into the disc recording and/or reproducing apparatus. The reason is that the movement restricting member 72 is engaged with or disengaged from the engagement opening 56 from the intruding end of the disc cartridge 21 into the disc recording and/or reproducing apparatus.

The engagement pieces may also be provided on the four sides of the rectangular engagement opening 56. By providing the bent pieces on the four sides, it is possible to prevent the material of the movement restricting member 72 from being scraped off by the inner peripheral surface of the acute-edged engagement opening 56, even if the shutter member 32 is rotated in a manner of being oscillated with respect to the main cartridge body unit 24, with the movement restricting member 72 remaining engaged with the engagement opening 56.

The engagement opening 56 may be circular or elliptical instead of being rectangular in profile. In such case, the above-mentioned merits can be retained by providing bent pieces on the side(s) perpendicular to the direction of movement of the shutter member 32.

By providing the front side end face of the main cartridge body unit 24 with a lubricating layer 59 of e.g., silicon oil, as shown in FIG. 5, the shutter member 32 can be moved more smoothly with respect to the main cartridge body unit 24.

By referring to the drawings, a second embodiment of the disc cartridge according to the present invention is explained in detail.

Since the disc cartridge of the present embodiment has the structure of the main cartridge body unit, housing the disc-shaped recording medium therein, in common with that of the above-described disc cartridge of the second embodiment, similar numerical figures are used to depict the common parts, while the detailed description for the common portions is omitted for simplicity.

Figure 10:
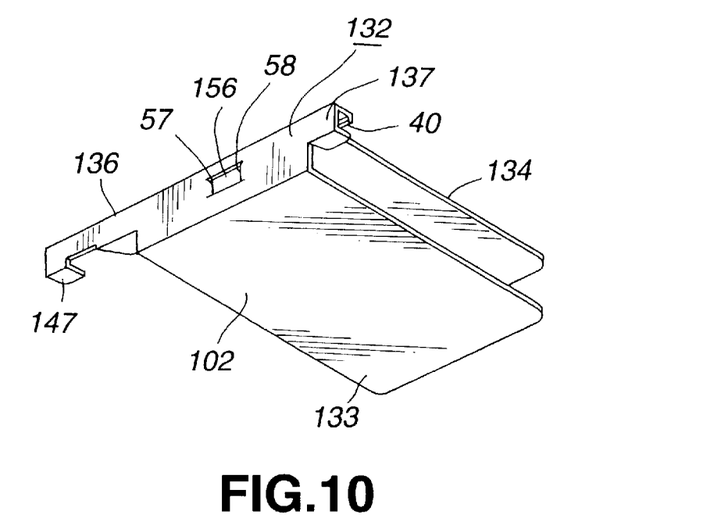
FIG. 10 is a perspective view showing a shutter member used in the second embodiment of the disc cartridge according to the present invention.

A shutter member 132 used in the present embodiment includes first and second shutter portions 133, 134, extending parallel to each other for closing the recording and/or reproducing apertures 30, 31 formed in the upper and lower sides of the main cartridge body unit 24, and a connecting piece 135 for interconnecting the proximal ends of these shutter portions 133, 134, and is of a U-shaped cross-sectional shape, as shown in FIG. 10. On both sides of the connecting piece 135 are protuberantly formed first and second movement guide portions 136, 137 of a U-shaped cross-section for guiding the direction of movement of the shutter member 132.

Figure 11:
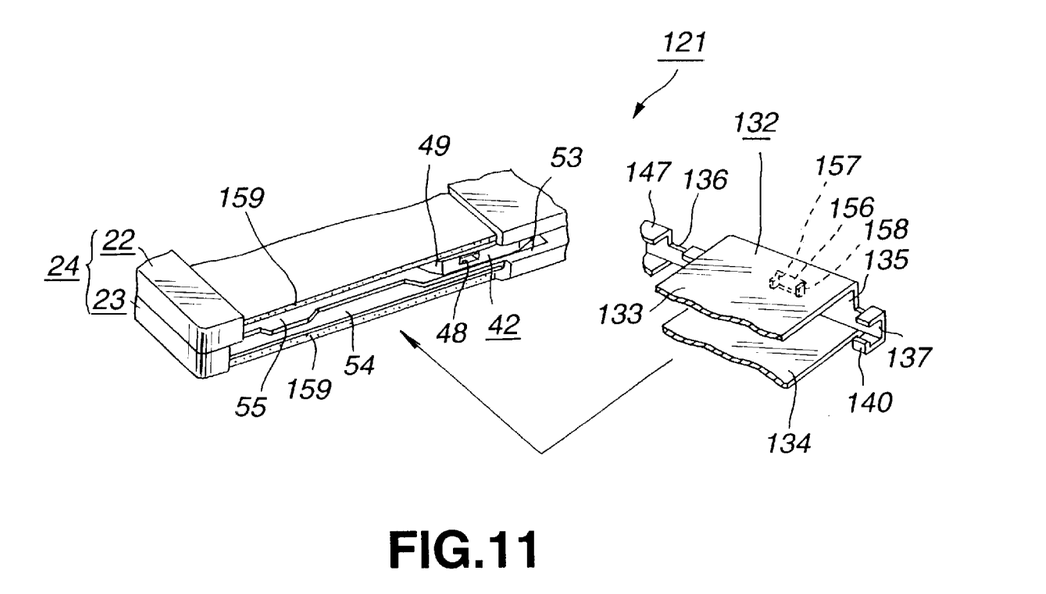
FIG. 11 is a perspective view showing the state of mounting a shutter member on the main cartridge body unit.

This shutter member 132 is formed of a thin aluminum sheet, which is punched, bent and severed to give a desired shape. The shutter member 132, thus produced, is fitted from the front side of the main cartridge body unit 24, so that the first and second shutter members 133, 134 are extended on the recording and/or reproducing apertures 30, 31, as shown in FIG. 11. The shutter member 132 is mounted for movement along the front side of the main cartridge body unit 24, for closing/opening the recording and/or reproducing apertures, not shown, formed on the outer sides of the lower cartridge half 23, while being prevented from being accidentally extricated from the main cartridge body unit 24, by the first and second movement guide portions 136, 137 fitting to the front side of the lower cartridge half 23 and by engagement pieces 140 formed by partially bending the first and second movement guide portions 136, 137 engaging in movement guide grooves, not shown, formed in the outer sides of the lower cartridge half 23, as shown in FIGS. 10 and 11, In the front surface of the main cartridge body unit 24, carrying the shutter member 132, and which is extended from an area in which the shutter member 132 is moved to the position opening the apertures 30, 31 to the position in which the shutter member 132 opens the apertures 30, 32, to the front side of the main cartridge body unit 24, there is formed a shutter member movement recess 41 of a depth approximately equal to the thickness of the metal sheet constituting the shutter member 132, as shown in FIG. 2. Since the shutter member 132 is arranged in the shutter member movement recess 41, the shutter member 132 is substantially flush with the outer surface of the main cartridge body unit 24. In this state, the shutter member 32 is mounted in the main cartridge body unit 24.

Figure 12:
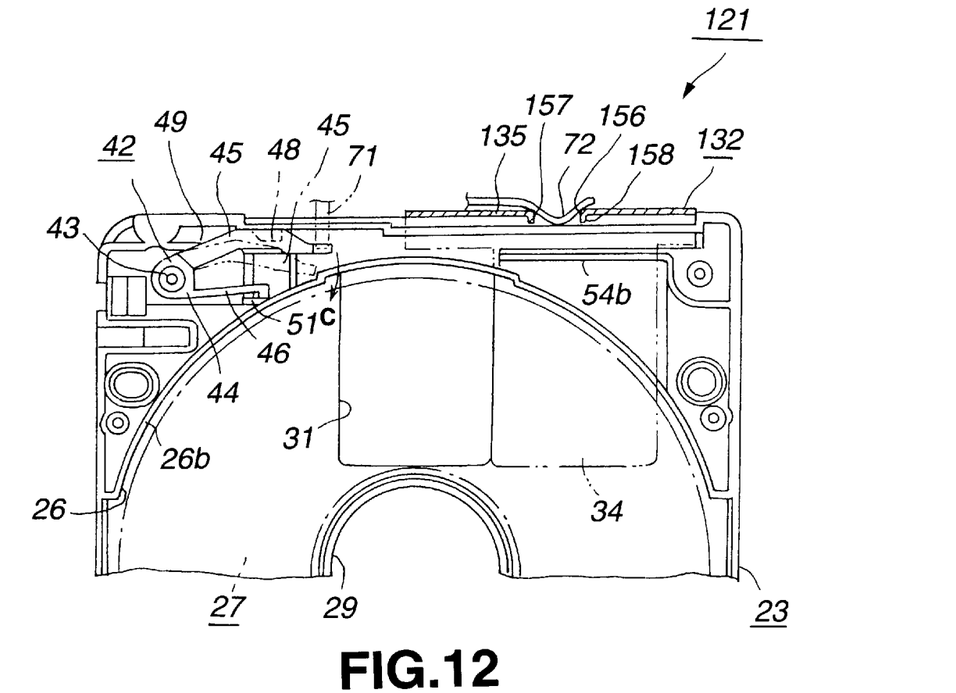
FIG. 12 is a plan view showing the state in which the shutter member has been moved to a position of opening the recording and/or reproducing aperture provided in the main cartridge body unit, with the upper cartridge half not being shown.

At a corner on the front side of the main cartridge body unit 24, there is mounted a shutter lock member 42 adapted for limiting the movement of the shutter member 132 moved to the position of closing the recording and/or reproducing apertures 30, 31, as shown in FIG. 11. The shutter lock member 42 is molded from synthetic resin and has a pivot portion 44 fulcrumed on a pivot shaft 43 set upright on the proximal side. From this pivot portion 44 are extended a lock arm section 45 and a resilient flexible portion 46 in opposite directions to each other. On a lateral side of a mid portion of the lock arm section 45 is formed an engagement recess 48, engaged by a lock piece 47, formed by bending a portion of a first movement guide portion 136 of the shutter member 32. This shutter lock member 42 is mounted within the main cartridge body unit 24, with the pivot portion 44 being fulcrumed by the pivot shaft 43 set upright on the lower cartridge half 23, with a lateral side of the lock arm section 45 carrying the engagement recess 48 facing a cut-out 49 formed in the front side of the main cartridge body unit 24 and with the distal end of the resilient flexible portion 46 compressing against a retention lug 51 formed upright in the lower cartridge half 23, as shown in FIG. 12. This shutter lock member 42 has the function similar to that described above and hence is not explained specifically for simplicity.

In the front side of the main cartridge body unit 24, on which the shutter member 32 is mounted for movement, there is provided an opening actuating member engagement groove 53, into which is intruded a shutter opening actuating member 71 provided on the disc recording and/or reproducing apparatus for resiliently displacing the shutter lock member 42 to disengage the lock piece 47 from the engagement recess 48 to cause movement of the shutter member 32 in a direction of opening the apertures 30, 31. This opening actuating member engagement groove 53 is formed by constituting a front wall section 54, making up a portion of the peripheral wall section 25 of the main cartridge body unit 24, on an inner recessed side of the main cartridge body unit 24. Therefore, the upstanding wall sections 54a, 54b, formed on the front surface sides of the upper and lower cartridge halves 22, 23 constituting the front wall section 54 are located on an inner recessed side of the upper and lower cartridge halves 22, 23 parallel to the front end faces of the upper and lower cartridge halves 22, 23. The cut-out 49, having its lateral side carrying the engagement recess 48 of the lock arm section 45 of the shutter lock member 42 faced by the outer side of the main cartridge body unit 24, is formed by partially cutting out the front wall section 54 , as shown in FIGS. 11 and 12. That is, the lock arm section 45 is protruded through the cut-out 49 into the opening actuating member engagement groove 53, as shown in FIG. 11.

On the front surface side of the lower cartridge half 23, there is provided a shutter guide wall section 55 within the opening actuating member engagement groove 53. The shutter guide wall section 55 restricts oscillations of the first and second movement guide portions 36, 37 fitted on the front surface of the lower cartridge half 23 to assure stabilized movement of the shutter member 32.

In the connecting piece 135 of the shutter member 132, mounted for movement along the front surface of the main cartridge body unit 24, there is bored an engagement opening 156 engaged by the movement restricting member 72 provided on the disc recording and/or reproducing apparatus. Similarly to the engagement opening in the above-described first embodiment, this engagement opening 156 is of a rectangular profile having its direction of movement relative to the main cartridge body unit 24 as a long axis.

Figure 13:
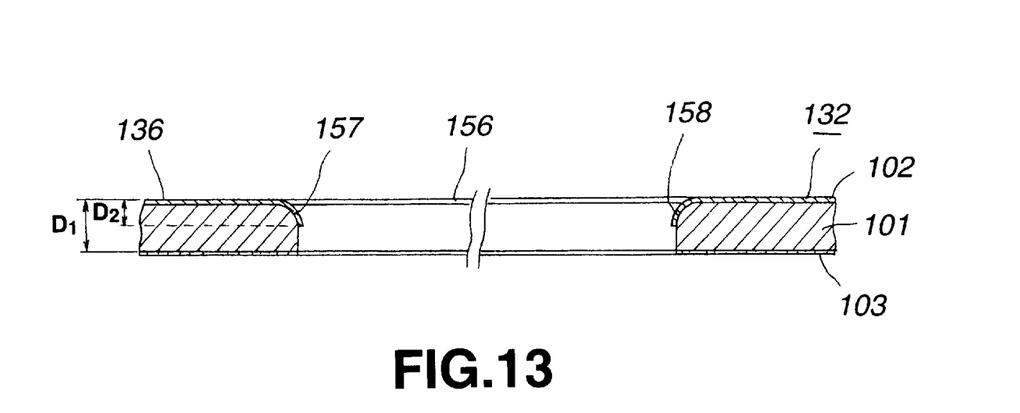
FIG. 13 is an enlarged cross-sectional view showing the engagement opening portion provided in the shutter member.

The engagement opening 156 is formed by punching out a portion of the connecting piece 135 during the step of producing the shutter member 132 by punching, bending and severing. On ridge lines of the facing sides of this engagement opening 156 perpendicular to the direction of movement of the shutter member 132 relative to the main cartridge body unit 24, towards the surface engaged by and disengaged from the movement restricting member provided on the disc recording and/or reproducing apparatus, there are formed curved portions 157, 158, as shown in FIG. 13. These curved portions 157, 158, produced on punching out the engagement opening, are provided over an extent D2 which is not less than one-half of the thickness D1 of an aluminum plate 101 constituting the shutter member 132.

Should the thickness D1 of the aluminum plate 101 used be 0.2 mm, the curved portions 157, 158 are formed over the extent D2 which is nor less than 0.1 mm.

On the surface and on the inner peripheral surface of the shutter member 32, carrying the curved portions 157, 158, on the ridge lines of the sides of the engagement opening 156, there are formed coating films 102, 103 of synthetic resin, as shown in FIG. 7. The coating film 102 is formed for covering the surfaces of the curved portions 157, 158. The coating films 102, 103 of synthetic resin are formed by printing, painting or coating an epoxy- or polyester-based synthetic resin material on the surface of the aluminum plate 101.

The synthetic resin material of the coating films 102, 103 is preferably superior in lubricity and in tight bonding to the aluminum plate 101.

Similarly to the disc cartridge 21 of the above-described first embodiment, the disc cartridge 121 is introduced into the disc recording and/or reproducing apparatus, with its lateral side perpendicular to its front side carrying the shutter member 132 as an intruding end.

When the disc cartridge 121 of the present second embodiment, constructed as described above, is introduced into the inside of the disc recording and/or reproducing apparatus, the movement restricting member 72, biased so as to be pressured against the front surface of the disc cartridge 21 provided on the disc recording and/or reproducing apparatus, rides on the first movement guide 136 of the shutter member 132, from the front side of the main cartridge body unit 24, to then ride on the connecting piece 135, as shown in FIG. 12. Next to the riding on the front surface of the main cartridge body unit 24 of the movement restricting member 72, the shutter opening actuating member 71 provided on the disc recording and/or reproducing apparatus is intruded into the opening actuating member engagement groove 53 to cause elastic displacement of the lock arm section 45 of the shutter lock member 42 inwardly of the main cartridge body unit 24 as indicated by arrow C in fog.12. When the disc cartridge 21 is further intruded into the interior of the disc recording and/or reproducing apparatus, the movement restricting member 72 is engaged in the engagement opening 156 provided in the connecting piece 135 to restrict movement of the shutter member 132, at the same time as the shutter opening actuating member 71 causes further resilient displacement of the lock arm section 49 into the inside of the main cartridge body unit 24 to disengage the lock piece 47 from the engagement recess 48.

It is noted that, when the movement restricting member 72 is engaged in the engagement opening 156, the movement restricting member 72 is engaged in the engagement opening 156 as it has sliding contact with curved portions 157, 158 provided on the ridge lines of the engagement opening 156, so that smooth engagement is realized without producing large frictional force. The provision of the coating film 102 of synthetic resin on the surfaces of the curved portions 157, 158 assures smoother engagement. If, after unlocking the shutter member 132, movement of the shutter member 132 is restricted, and the disc cartridge 121 is further introduced into the inside of the disc recording and/or reproducing apparatus, the main cartridge body unit 24 is moved relative to the movement-restricted shutter member 132, thus opening the recording and/or reproducing apertures 30, 31. Since the shutter member 132 is maintained in the movement-restricted state by the movement restricting member 72, the opened state of the apertures 30, 31 is maintained. The optical pickup device and/or the magnetic head faces the optical disc 27 through these apertures 30, 31 to enable recording and/or reproduction of information signals.

When the recording of information signals on the optical disc 27 or the reproduction of the information signals recorded on the optical disc 27 comes to a close, such that the optical disc 27 is to be ejected, the disc cartridge 121 is moved towards the outside of the recording and/or reproducing apparatus. Since the shutter member 132 is kept in its movement-restricted state by the movement restricting member 72, only the main cartridge body unit 24 is moved relative to the shutter member 132, so that the shutter member 132 performs relative movement in the direction of closing the apertures 30, 31. When the main cartridge body unit 24 has been moved to the position of closing the apertures 30, 31, the lock piece 47 is engaged in the engagement recess 48 of the shutter lock member 42 to maintain the apertures 30, 31 in the closed state by the shutter member 132. At this time, the disc cartridge 121 is projected partially to outside of the disc recording and/or reproducing apparatus, so that, by gripping and pulling out the protruded portion of the disc cartridge 1 from the disc recording and/or reproducing apparatus, the disc cartridge 1 is taken out from the disc recording and/or reproducing apparatus. Since the movement restricting member 72 is separated from the engagement opening 156 as it is slidingly contacted with the curved portions 157, 158, it can be smoothly disengaged without producing large frictional force.

Since the disc cartridge 121 of the present embodiment is provided with the curved portions 157, 158 on the ridge lines of the side of the engagement opening 156 perpendicular to the direction of movement of the shutter member 132, with the engagement opening 156 being engaged by or disengaged from the movement restricting member 72 provided on the disc recording and/or reproducing apparatus, with the movement restricting member 72 being resiliently biased into pressure contact with the front side of the disc cartridge 121, the force of friction produced on engagement or disengagement of the movement restricting member 72 with or from the engagement opening 156 may be diminished to reduce the wear caused to the inner surface of the engagement opening 156 inclusive of ridge lines or to the peripheral surface of the movement restricting member 72, thus assuring smooth engagement and disengagement over a prolonged period of time. In particular, the disc cartridge 121 can be ejected from the disc recording and/or reproducing apparatus with an optimum operating feeling.

In the above-described disc cartridge 121, the curved portions 157, 158 are provided on the ridge lines of two sides of the engagement opening 156 perpendicular to the direction of movement of the shutter member 132. Alternatively, only the bent piece 157 may be provided which is disposed on the intruding end of the disc cartridge 121 into the disc recording and/or reproducing apparatus. The reason is that the movement restricting member 72 is engaged with or disengaged from the engagement opening 156 from the intruding end of the disc cartridge 121 into the disc recording and/or reproducing apparatus.

The curved portions may also be provided on the ridge lines of four sides of the rectangular engagement opening 156. By providing the curved portions on the four sides, it is possible to prevent the material of the movement restricting member 72 from being scraped by the inner peripheral surface of the acute-edged engagement opening 156.

The engagement opening 156 may also be in a circular or elliptical shape, instead of being in a rectangular shape. In such case, the above-mentioned merit can be realized by providing the curved portions on the side of the connecting piece extending perpendicularly to the direction of movement of the shutter member 132.

Since the above-mentioned shutter member 132 is provided with the coating films 103 not only on its surfaces but also on its inner peripheral surfaces, smooth movement operations may be achieved for the main cartridge body unit 24. By providing a lubricating layer 159 of coated silicon oil on the front surface side end face of the main cartridge body unit 24, as shown in FIG. 11, the shutter member 132 can be moved smoothly with respect to the main cartridge body unit 24.

For achieving smooth engagement/disengagement of the movement restricting member 72 with respect to the engagement opening 156, and for preventing wear to the inner peripheral surface of the engagement opening 156 and to the surface of the movement restricting member 72, there is no necessity of providing the coating film 103 on the inner peripheral surface of the shutter member 132.

Although the shutter member 132 in the above-described first embodiment is constituted by an aluminum plate, it may also be constituted by a thin plate of metal other than aluminum, such as stainless steel.

Although recording and/or reproducing apertures are provided in both surfaces of the main cartridge body unit of the disc cartridge of each of the foregoing embodiments, the recording and/or reproducing apertura may be provided only in the lower surface of the main cartridge body unit, in which case the shutter member 32, 132 may be provided with only sole shutters 34, 134, respectively.

The present invention is applied not only to the disc cartridge housing an optical disc, but may be applied with comparable merits to a disc cartridge in which there is provided a shutter member for opening/closing the recording and/or reproducing aperture provided in the main cartridge body unit and in which, when the disc cartridge is loaded on the disc recording and/or reproducing apparatus, a movement controlling member provided on the disc recording and/or reproducing apparatus is engaged with or disengaged from the engagement opening provided in the shutter member.

What is claimed is:

1. A disc cartridge comprising:

a main cartridge body unit for rotatably housing therein a disc-shaped recording medium, said main cartridge body unit having an aperture for exposing at least a portion of a signal recording area of the disc-shaped recording medium to outside along a radial direction of the disc; and a shutter member having shutter portions extending to outside of said main cartridge body unit for opening/closing said aperture, and a connecting piece connected to the proximal ends of said shutter portions and adapted for being moved with respect to a lateral side of said main cartridge body unit, said shutter member being mounted for movement on said main cartridge body unit;

said connecting piece of said shutter portions having an engagement opening for engagement by a movement controlling member for the shutter member provided on a recording and/or reproducing apparatus, the sides of said engagement opening along the direction of movement of said shutter member being formed integrally with bent pieces.

2. The disc cartridge according to claim 1 wherein said engagement opening is rectangular in profile and wherein said bent pieces are disposed on both sides of said engagement opening in the movement direction of said shutter member and are bent towards the inner side of said shutter member.

3. The disc cartridge according to claim 1 wherein a plurality of said apertures are formed facing each other on the upper and lower sides of the main cartridge body unit and wherein said shutter member has a pair of shutter portions for covering the upper and lower sides of said main cartridge body unit, said connecting piece interconnecting the proximal ends of said shutter portions.

4. A disc cartridge comprising:

a main cartridge body unit for rotatably housing therein a disc-shaped recording medium, said main cartridge body unit having an aperture for exposing at least a portion of a signal recording area of the disc-shaped recording medium to outside along a radial direction of the disc; and a shutter member having shutter portions extending to outside of said main cartridge body unit for opening/closing said aperture, and a connecting piece connected to the proximal ends of said shutter portions and adapted for being moved with respect to a lateral side of said main cartridge body unit, said shutter member being mounted for movement on said main cartridge body unit;

said connecting piece of said shutter portions having an engagement opening for engagement by a movement controlling member for the shutter member provided on a recording and/or reproducing apparatus, said engagement opening is provided with curved portions which are provided with coating films of synthetic resin along ridge lines of sides of said engagement opening extending along the direction of movement of said shutter member.

5. The disc cartridge according to claim 4 wherein said curved portions are formed for extending over a range of not less than one-half of the thickness of a metal sheet making up said shutter member.

6. The disc cartridge according to claim 4 wherein said shutter member is formed using an aluminum plate having a surface coating film of synthetic resin.

* * * * *